United States Patent
Ouwerkerk et al.

(10) Patent No.: US 7,326,495 B2
(45) Date of Patent: Feb. 5, 2008

(54) HYDROGEN STORAGE MATERIAL WITH HIGH STORAGE CAPACITY

(75) Inventors: Martin Ouwerkerk, Eindhoven (NL); Danielle Beelen, Eindhoven (NL); Wilhelmus Cornelis Keur, Eindhoven (NL); Henricus Albertus Maria Van Hal, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 333 days.

(21) Appl. No.: 10/531,901

(22) PCT Filed: Oct. 17, 2003

(86) PCT No.: PCT/IB03/04601

§ 371 (c)(1),
(2), (4) Date: Apr. 18, 2005

(87) PCT Pub. No.: WO2004/036664

PCT Pub. Date: Apr. 29, 2004

(65) Prior Publication Data

US 2006/0051656 A1  Mar. 9, 2006

(30) Foreign Application Priority Data

Oct. 21, 2002 (EP) .................................. 02079383

(51) Int. Cl.
*H01M 4/38* (2006.01)
*C01B 3/00* (2006.01)

(52) U.S. Cl. .................................... 429/218.2; 420/900

(58) Field of Classification Search ................ 420/900, 420/402; 206/0.7; 96/108; 429/12, 21, 429/40, 209, 218.2; 423/648.1, 658.2
See application file for complete search history.

(56) References Cited

U.S. PATENT DOCUMENTS

| | | | |
|---|---|---|---|
| 6,106,801 A | 8/2000 | Bogdanovic et al. | |
| 2002/0122981 A1* | 9/2002 | Ouwerkerk et al. | ..... 429/218.2 |
| 2006/0073066 A1* | 4/2006 | Osawa et al. | ............. 420/402 |

FOREIGN PATENT DOCUMENTS

| JP | 56114801 A | 9/1981 |
|---|---|---|
| WO | WO9920422 A1 | 4/1999 |
| WO | WO0138591 A2 | 5/2001 |

OTHER PUBLICATIONS

R. Schulz, et al: Recent Developments in the Applications of Nanocrystalline Materials to Hydrogen Technologies, A267, 1999, pp. 240-245.

* cited by examiner

*Primary Examiner*—Frank M. Lawrence

(57) ABSTRACT

Disclosed is a hydrogen storage material comprising a magnesium hydride. Said magnesium is stabilized in the fluorite structure. Preferably, the magnesium is at least partly substituted by an element such that the magnesium hydride is stabilized in the fluorite structure. In an advantageous embodiment, the hydrogen storage material also comprises a catalytically active material. Furthermore, an electrochemically active material, as well as an electrochemical cell comprising the above hydrogen storage material are disclosed.

11 Claims, 1 Drawing Sheet

HYDROGEN STORAGE MATERIAL WITH HIGH STORAGE CAPACITY

Figure 1A:
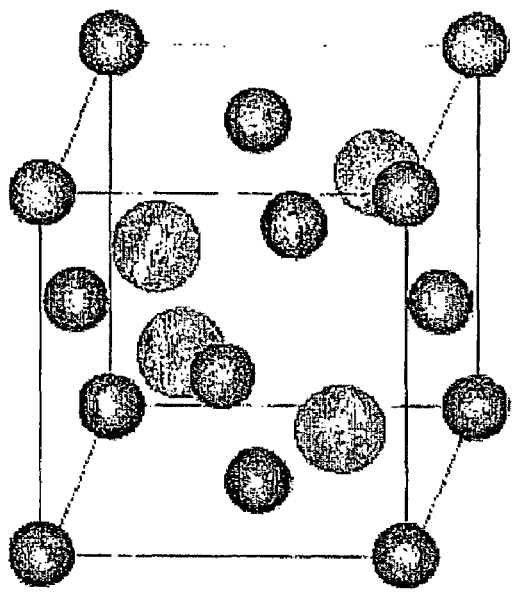

The present invention relates to a hydrogen storage material, comprising magnesium hydride. The invention also relates to an electrochemical cell comprising such a hydrogen storage material.

Rechargeable batteries can be discharged and then restored to their original state for re-use. Rechargeable batteries are increasingly used in portable electronic equipment such as telephones, walkmans, and computers. A known type of rechargeable battery is the so-called rechargeable metal hydride battery, which has a relatively high storage capacity per unit volume. An example of such a metal hydride battery is a battery comprising $LaNi_5$ as the electrochemically active material, more specifically as a negative electrode. In the discharged condition, the negative electrode comprises $LaNi_5$, while in the charged condition hydrogen is absorbed by said electrode, resulting in $LaNi_5H_6$. A disadvantage of this type of battery is the relatively low storage capacity per unit weight. The latter is caused by the high density of the metal hydride, which is about 7 g/cm$^3$.

For some time now research has been directed to suitable metal hydrides with a lower density that can act as a hydrogen storage material. In theory, magnesium is very suitable for hydrogen absorption as it can store large amounts of hydrogen. Magnesium can reversibly store up to 7.65 weight % of hydrogen, making it a very suitable candidate for hydrogen storage for fuel cell applications. However, the temperature at which the magnesium can be charged and discharged is 400° C. The kinetics for hydrogen exchange at temperatures below 400° C. are very slow due to slow diffusion of hydrogen in the magnesium hydride.

Magnesium-nickel alloys appear to be better candidates for hydrogen storage material that can be used in electrochemical cells, as these alloys can be used for hydrogen absorption at lower temperatures.

The use of magnesium-nickel hydride for hydrogen storage is also disclosed in JP-56114801. According to the latter publication, said material can store hydrogen in a stable way at high temperatures. Although magnesium-nickel hydride can absorb a relatively large amount of hydrogen, it is as such not suitable as an electrochemically active material in an electrochemical cell. One of the reasons for this is the relatively slow kinetics of hydrogen absorption and hydrogen release.

In order to improve the kinetics of hydrogen absorption and hydrogen release to a sufficient level and to restrict corrosion, the amount of nickel added to a magnesium-nickel alloy has to be so high that only a small improvement is obtained in comparison with the known $LaNi_5$ material.

The present invention aims to provide a hydrogen storage material which can be applied in an electrochemical cell, which comprises a magnesium hydride, and which has a high storage capacity per unit weight.

To this end, the present invention provides a hydrogen storage material as defined in the preamble, which is characterized in that the magnesium hydride is stabilized in the fluorite crystal structure.

Figure 1B:
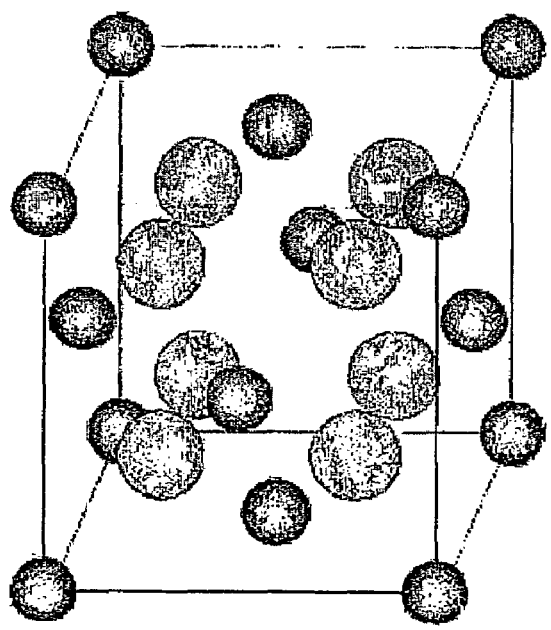

FIG. 1a provides a schematic drawing of the hydrogen-depleted sphalerite structure in accordance with an embodiment; and FIG. 1b provides a schematic drawing of the fluorite structure in accordance with an embodiment.

The present invention is based on the insight that the slow diffusion of hydrogen in magnesium hydride is mainly due to the structure of the magnesium hydride, namely the rutile structure. Hydrogen does not diffuse fast in said rutile structure, but it does diffuse fast in calcium fluoride-hydride, which has the fluorite structure. By stabilizing magnesium hydride in the fluorite structure, a fast diffusion of hydride ions can be obtained therein. Said fast diffusion is possible due to the presence of large empty octahedral sites in the fluorite structure through which the ions can move with high mobility. As a result of the improved fast diffusion of hydrogen in magnesium hydride with fluorite structure, the magnesium hydride can be very easily charged and discharged with hydrogen at room temperature. As a result, said magnesium hydride can advantageously be used as a hydrogen storage material in electrochemical cells.

In particular, the magnesium is at least partly substituted by an element such that the magnesium hydride is stabilized in the fluorite structure.

A suitable element, the hydride of which has a fluorite structure, can form a solid solution with magnesium hydride of between 20 and 80 mole % magnesium.

The element used to substitute the magnesium preferably comprises an ion with a size that is similar to the size of $Mg^{2+}$ in VIII coordination.

In an advantageous embodiment, the element comprises an ion with a radius in a range of 0.090-1.120 nm.

Particular preferred elements comprise the ions selected from the group comprising $Sc^{3+}$, $Ti^{3+}$, $RE^{3+}$ (Rare Earth elements), $Y^{3+}$, $Li^+$, $Zn^{2+}$, $Co^{2+}$, $Fe^{2+}$, $Mn^{2+}$, $In^{3+}$, $Zr^{4+}$, and $Hf^{4+}$.

For example, scandium hydride has the fluorite structure and forms a solid solution with magnesium hydride of between 0 and 80 mole % magnesium. Upon depletion of hydrogen from such a solid solution, a phase transition to a different structure is observed. XRD simulations show this structure to have an XRD pattern identical to a sphalerite structure. It has the same arrangement of metal ions as the fluorite structure as well as the empty octahedral sites.

It is also possible to manufacture magnesium titanium hydride having the fluorite structure. When $Mg_{50}Ti_{50}Pd_{2.4}H_x$ is discharged at 10 mA/g a total of 630 mAh/g charge is extracted. The comparable material $Mg_{50}Sc_{50}Pd_{2.4}H_x$ yields 770 mAh/g upon discharge at 10 mA/g. The preparation of $Mg_{50}Ti_{50}Pd_{2.4}H_x$ is as follows: 3.45 g $MgH_2$, 6.55 g $TiH_2$ and 0.2 g Pd are milled in an atmosphere of 7 bar hydrogen in a Uni Ball Mill model II at 500 RPM for one day. After the addition of an extra 0.47 g palladium the milling is continued under the same conditions for another 5 days. XRD analysis showed that the resulting material comprised substantially single phase cubic structure with a lattice constant a little higher than that of the fluorite structured $TiH_2$ (0.4503 nm compare to 0.4454 nm).

In order to improve the hydrogen exchange kinetics, the hydrogen storage material preferably comprises an amount of a catalytically active material.

Preferred examples of such catalytically active materials comprise catalysts from the group consisting of Ir, Ni, Pd, Pt, Rh, and Ru.

Even more preferred as catalytically active material are palladium and rhodium.

Furthermore, the present invention relates to an electrochemically active material that is characterized in that the material comprises a hydrogen storage material according to the present invention as described above.

The hydrogen storage material according to the present invention can advantageously be used in fuel cells.

The invention also relates to an electrochemical cell comprising a negative electrode. Said electrochemical cell is characterized in that the negative electrode comprises a hydrogen storage material as described above.

The electrochemical cell preferably comprises a rechargeable battery.

Finally, the present invention relates to electronic equipment powered by at least one electrochemical cell. Said electronic equipment is characterized in that the at least one electrochemical cell is an electrochemical cell as described above.

The present invention is illustrated by the following examples as well as the Figures, all given by way of example only.

EXAMPLE 1

Magnesium hydride in the fluorite structure, wherein part of the magnesium is substituted by scandium, was prepared by melting weighed quantities of the magnesium, the scandium, and—if desired—a catalyst in a sealed molybdenum crucible.

The crucible was placed in a quartz tube, which was placed in a tube furnace. Before the melting process was started, the air inside the quartz tube was replaced by purified argon to avoid oxidation of the molybdenum bomb.

The sample was heated to about 100° C. above the liquids for one night. After heating, the quartz tube was submerged in a water bath to "quench" the sample. Next, the sample was annealed at 450° C. for 4 days. Last, the molybdenum bomb was removed, by mechanical milling.

The energy capacities of the materials according to the present invention are considerable. For example, $Mg_{65}Sc_{35}Pd_{2.4}H_x$ has a storage capacity of 1225 mAh/g, and $Mg_{80}Sc_{20}Pd_{2.4}H_x$ provides a storage capacity of 1450 mAh/g.

FIG. 1a provides a schematic drawing of the hydrogen-depleted sphalerite structure, and FIG. 1b gives a schematic drawing of the fluorite structure. The smaller spheres in FIGS. 1a,b are metals, in this case magnesium and scandium. The larger spheres are the hydride ions. The metal ions have a size of 0.102 nm, while the hydride ions have a size of 0.14 nm. FIG. 1 clearly shows the large empty octahedral sites in the fluorite structure through which the hydride ions can move with high mobility. As a result of the improved fast diffusion of hydrogen in magnesium hydride with fluorite structure, the magnesium hydride can be very easily be charged and discharged with hydrogen at room temperature.

Although the invention has been described with reference to one example and one embodiment, it is to be understood that it is clearly not intended to limit the invention to this example and embodiment. On the contrary, the present invention is intended to cover all alternatives and modifications that may be included within the spirit and scope of the invention as described by the claims.

The invention claimed is:

1. A hydrogen storage material comprising magnesium hydride, wherein the magnesium hydride is stabilized in a fluorite crystal structure.

2. The hydrogen storage material according to claim 1, wherein the magnesium is at least partly substituted by an element such that the magnesium hydride is stabilized in the fluorite structure.

3. The hydrogen storage material as claimed in claim 2, wherein the element comprises an ion with a size that is similar to the size of $Mg^{2+}$ in a VIII coordination.

4. The hydrogen storage material as claimed in claim 2, wherein the element comprises an ion with a radius in the range of 0.090-1.120 nm.

5. The hydrogen storage material as claimed in claim 2, wherein the element comprises an ion selected from the group consisting of $Sc^{3+}$, $Ti^{3+}$, $RE^{3+}$ (Rare Earth elements), $Y^{3+}$, $Li^+$, $Zn^{2+}$, $Co^{2+}$, $Fe^{2+}$, $Mn^{2+}$, $In^{3+}$, $Zr^{4+}$, and $Hf^{4+}$.

6. The hydrogen storage material as claimed in claim 1, wherein the hydrogen storage material comprises an amount of a catalytically active material.

7. The hydrogen storage material as claimed in claim 6, wherein the catalytically active material comprises at least one metal selected from the group consisting of Ir, Ni, Pd, Pt, Rh, and Ru.

8. The hydrogen storage material as claimed in claim 6, wherein the catalytically active material comprises palladium or rhodium.

9. An electrochemically active material, wherein the material comprises a hydrogen storage material as claimed in claim 1.

10. An electrochemical cell comprising a positive electrode and a negative electrode, wherein the negative electrode comprises a hydrogen storage material as claimed in claim 1.

11. Electronic equipment powered by at least one electrochemical cell, wherein the at least one electrochemical cell is an electrochemical cell as claimed in claim 10.

* * * * *